United States Patent
Schwan et al.

(10) Patent No.: US 7,738,466 B2
(45) Date of Patent: Jun. 15, 2010

(54) DISTRIBUTED HASHING MECHANISM FOR SELF-ORGANIZING NETWORKS

(75) Inventors: Nico Schwan, Stuttgart (DE); Thomas Strauss, Esslingen (DE); Marco Tomsu, Ditzingen (DE); Jurgen Sienel, Leonberg (DE); Marcus Kessler, Stuttgart (DE)

(73) Assignee: Alcatel Lucent, Paris (FR)

( * ) Notice: Subject to any disclaimer, the term of this patent is extended or adjusted under 35 U.S.C. 154(b) by 283 days.

(21) Appl. No.: 11/771,825

(22) Filed: Jun. 29, 2007

(65) Prior Publication Data

US 2008/0123664 A1 May 29, 2008

(30) Foreign Application Priority Data

Jul. 7, 2006 (EP) ................... 06300773

(51) Int. Cl.
*H04L 12/28* (2006.01)
(52) U.S. Cl. ................. 370/395.32
(58) Field of Classification Search ............ 370/395.32
See application file for complete search history.

(56) References Cited

U.S. PATENT DOCUMENTS 4,527,270 A * 7/1985 Sweeton ............. 714/47

2006/0074876 A1* 4/2006 Kakivaya et al. ............ 707/3
2007/0230482 A1* 10/2007 Shim et al. ................ 370/400

FOREIGN PATENT DOCUMENTS

WO WO 2006/068365 A1 6/2006
WO WO 2006068365 A1 * 6/2006

OTHER PUBLICATIONS

WIPO Pub. No. WO 2006/068365 to You et al. on Jun. 29, 2006.*
Chord: A Scalable Peer-to-peer Lookup Protocol for Internet Applications, IEEE/ACM Transactions on Networking Feb. 2003 to Stoica et al.*
WIPO Pub. No. WO 2006/068365 to You et al.*
I. Stoica, et al.: "CHORD: A Scalable Peer-to-Peer Lookup Protocol for Internet Applications," IEEE/ACM Transactions on Networking, vol. 11, No. 1, Feb. 2003, pp. 17-32.

* cited by examiner

*Primary Examiner*—Ayaz R Sheikh
*Assistant Examiner*—Hai-Chang Hsiung
(74) *Attorney, Agent, or Firm*—Fay Sharpe LLP

(57) ABSTRACT

A method for retrieving content of a distributed directory of a telecommunication system comprising a plurality of nodes arranged in a directed ring topology, the method comprising the steps of identifying a storage location of said content by means of a distributed hashing function, where the hashing function maps an element onto a node, where the node is responsible carrying elements with a hash value between the node and its successor node. The invention further concerns a corresponding computer software product, telecommunication device, and a telecommunication system.

4 Claims, 8 Drawing Sheets

DISTRIBUTED HASHING MECHANISM FOR SELF-ORGANIZING NETWORKS

BACKGROUND OF THE INVENTION

The invention is based on a priority application EP06300773.6 which is hereby incorporated by reference.

The invention relates to a method, a computer software product, a telecommunication device and a telecommunication system for retrieving content of a distributed directory.

Communication systems with low operating expenditures (OPEX) having a minimum centralized infrastructure often use highly distributed databases in overlay networks (e.g. peer-to-peer networks). They implement self-organizing mechanisms to create a robust topology and to ensure consistency of the stored data. The use of load balancing, backup strategies and intelligent routing of database queries increases and service invocations have an impact on the overall efficiency of those networks.

I. Stoica, R. Morris, D. Liben-Nowell, D. Karger, M. F. Kaashoek, F. Dabek, and H. Balakrishnan, described in "CHORD: A Scalable Peer-to-peer Lookup Protocol for Internet Applications". IEEE/ACM Transactions on Networking, Vol 11, No 1 (February 2003), pp. 17-32, a solution that forms an overlay ring topology and creates redundant links to its succeeding network nodes. The redundant links enable the network to endure the failure of a node. Each node is part of a distributed database used for lookup issues and thus is responsible for a specific part of the complete stored data. Queries to the database are routed to successor nodes along the ring or along some shortcuts, called fingers, until it reaches the one who is responsible. For backup reasons in case of node failure each nodes forward its data to its successor node(s).

The Chord protocol specifies how to find a location of keys, how new nodes join the system, and how to recover from the failure (or planned departure) of existing nodes. At its heart, Chord provides fast distributed computation of a hash function mapping keys to nodes responsible for them. It uses consistent hashing. With high probability a hash function balances load, i.e. all nodes receive roughly the same number of keys. Also with high probability, when a node joins (or leaves) the network, only a limited fraction of the keys are moved to a different location.

Chord improves the scalability of consistent hashing by avoiding the requirement that every node knows about every other node. A Chord node needs only few routing information. Because this information is distributed, a node resolves the hash function by communicating with a few other nodes. A lookup messages requires $O(\log n)$ hops. Chord must update the routing information when a node joins or leaves the network; a join or leave requires $O(\log^2 n)$ messages.

The consistent hash function assigns each node and key an identifier using a base hash function. A node's identifier is chosen by hashing the node's IP address, while a key identifier is produced by hashing the key. Consistent hashing assigns keys to nodes as follows: Identifiers are (linearly ordered) arranged in an identifier circle, i.e. with respect to some modulo arithmetic. A key is assigned to the first node whose identifier is equal to or follows the identifier. This node is called the successor node of a key. Consistent hashing is designed to let nodes enter and leave the network with minimal disruption. To maintain the consistent hashing mapping when a node joins the network, certain keys previously assigned to a successor now become assigned to the joined node. When a node leaves the network, all of its assigned keys are reassigned to a successor.

Chord uses links to successor nodes for backup and routing issues. Therefore, the backup data cannot be leveraged for load balancing, as a request approaches the responsible node from behind, but the backup data is stored ahead along the ring.

Newly joining nodes have to wait passively until they are integrated into the network by their predecessor. This results in the effect that the joining time is not deterministic and statistically distributed. In advance routing database requests can be improved.

SUMMARY OF THE INVENTION

The invention focuses the problem of providing a distributed communication system with an improved distributed database having load balancing, instant joining, and being more efficient.

This is solved by a method for retrieving content of a distributed directory of a telecommunication system comprising a plurality of nodes arranged in a directed ring topology, the method comprising the steps of identifying a storage location of said content by means of a distributed hashing function, where the hashing function maps an element onto a node, where the node is responsible carrying elements with a hash value between the node and its successor node.

Preferably, a redundancy successor link is used in the opposite direction, i.e. in reverse to the ring direction, for identifying neighbor nodes for data replication to generate backups at the neighbor nodes in case of node failure.

In advance it is preferred to replicate data for backup reasons on nodes that are most probably involved in the routing of a lookup.

And it is preferred to insert a new node immediately by establishing a first binding the new node to the predecessor node, while the predecessor node remains fully connected to its successor node, then transferring the elements from the predecessor node to the new node, afterwards the successor and the redundancy links are transferred from the predecessor node to the new node, and finally joining the new node into the ring topology, then updating redundancy links by the predecessor node with the link to the successor node.

The problem is solved inter alia by a computer software product comprising programming means that are adapted to perform the method. This program usually is executed at a telecommunication device or within a whole telecommunication system comprising such telecommunication devices as nodes.

The invention has several advantages. In an equally distributed (real) look-up a significant reduction of load can be achieved. In heterogeneous scenarios, where some resources are requested more often than others, i.e. a request concentration on a node the improvement is even better.

Backup data arranged according to the invention can be leveraged for load-balancing. The final unnecessary 'deer-jumps' are avoided. Message routing requires one hop less per query. The stabilize ping to the predecessor node in Chord is not necessary. The new method provides a higher data consistency level, since a joining node is first taking over all data it is responsible for, before it is finally and instantaneously joining the ring topology. In advance, the joining time only depends of the amount of data to be transferred onto the joining node and is not randomly distributed. In cases where nodes leave and join at a very high rate (churn rate) the stability degrades faster. This is an academic problem as the churn rates of practical systems are low. The invention describes three variations of a Chord like system, leading to significant advantages in terms of data consistency and peak request processing load for the nodes:

BRIEF DESCRIPTION OF THE DRAWINGS

The invention is carried out in detail using the figures, where.

DETAILED DESCRIPTION OF THE DRAWINGS

The invention comprises an overlay network and the network elements as a distributed database and mechanisms to run that network. The overlay networks topology is a ring, very similar to well known prior art peer-to-peer network Chord. Some new and advantageous mechanisms for the routing of messages, data responsibility and data backup are introduced.

The overlay network is formed of any number of nodes, basically without the use of a central control unit limiting scalability and increasing OPEX (except some bootstrap support). Each of the nodes has a unique identifier and creates links to the nodes with subsequent higher identifiers. This mechanism leads to a ring topology, where the neighbouring nodes act as predecessor (P) or as successor (S) of a node (I).

Figure 1:
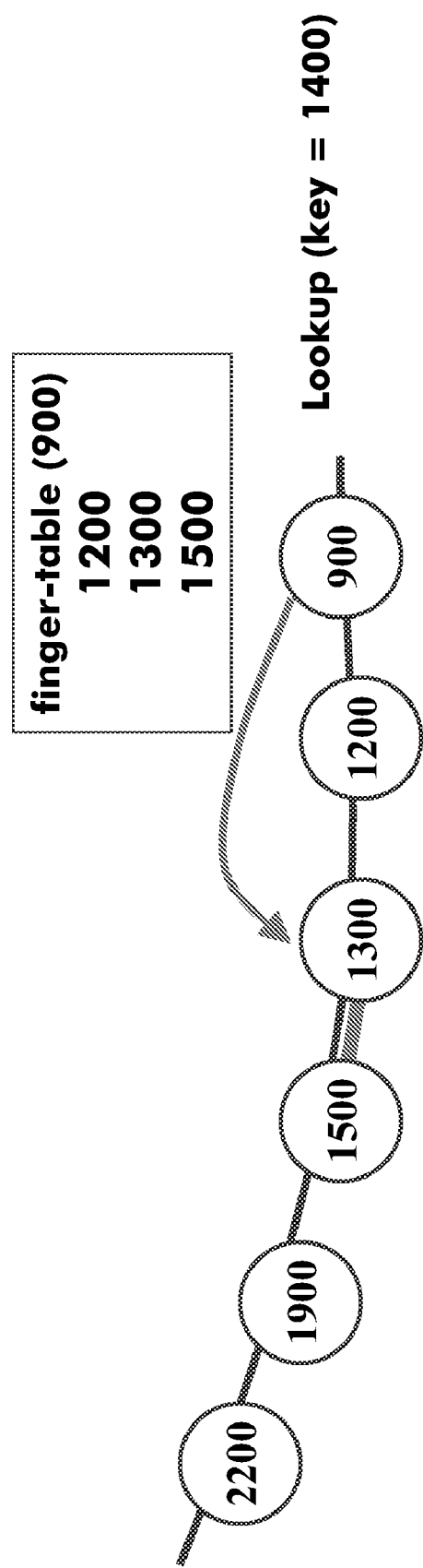
FIG. 1 illustrates the responsibility of a node in the method according to the invention

FIG. 1 shows a section of a ring comprising nodes 900, 1200, 1300, 1500, 1900, 2200. Each node is responsible for key/value pairs that have to be stored in the distributed database. A well-known hash function maps data to keys. Each node is responsible to store the keys that are located between itself and its successor.

Messages between nodes are routed by forwarding the message to the next known node with a smaller identifier compared to the destination identifier (equals to reused key).

The FIG. 1 shows the lookup of key 1400. Starting from a first node 900 having the shown finger table, the rooting path has to follow the finger ending at the destination node 1300. This node is responsible for the key 1400. The finger is shown by the arrow. Note that there is no deer jump from the destination node 1300 to the further node 1500 along the ring.

Known nodes are approached either along the ring (via the successor nodes) or along some shortcut links (called fingers). A mechanism ensures that the data stored in the database is replicated on the predecessor nodes. A load balancing is achieved if database queries are already answered by the predecessor nodes. A joining node receives the data it is responsible for from its new predecessor before being integrated in the topology. The integration of the node into the ring is finished instantaneously after the data transfer, independent from other nodes. If a node leaves the ring with its part of the database, its predecessor becomes responsible for the data.

Figure 2:
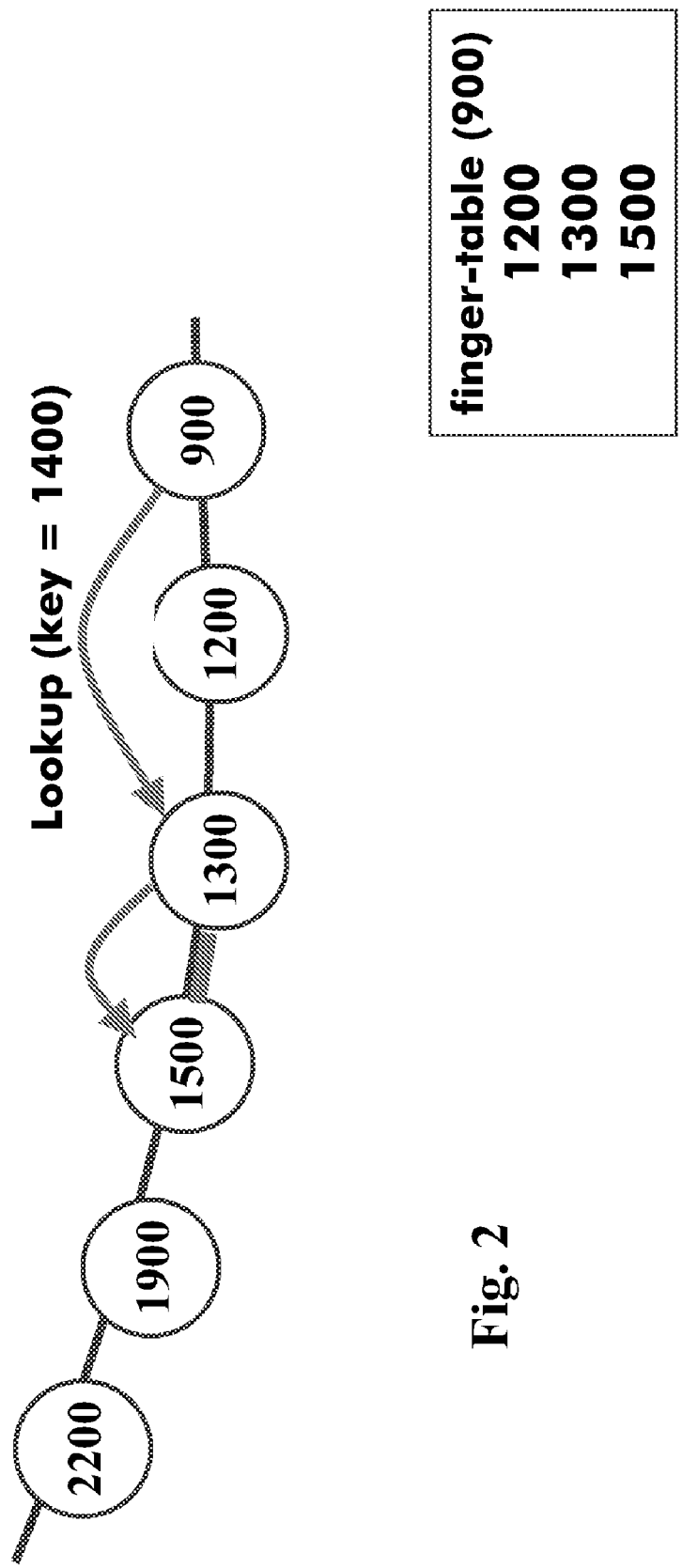
FIG. 2 illustrates the responsibility of a node in the Chord method according to prior art

The invention is described along the differences to the well known Chord algorithm. The Chord overlay network creating the ring topology by forming where the same section is shown in FIG. 2. The difference is that when seeking for the key 1400, the destination node 1300 is visited via the finger, but then a further jump to the final destination node 1500 is necessary, since this node is in Chord responsible for the key 1400. In Chord a node is said to be responsible to store a key/value pair if the key is equal or smaller than its own identifier and higher than its predecessors identifiers.

Each node is responsible to keep a list of successor nodes up-to-date to ensure that the ring topology remains closed in case of node failures. For backup reasons the successor nodes replicate the database contents from all of their predecessors. Using the straight forward divide and conquer algorithm a message arrives at its destination in maximum O(log n) hops.

Load balancing is improved by combining data replication and topology redundancy mechanism. In Chord as well as the improved one, the ring topology is hardened against node failure by adding additional redundancy successor links.

Figure 3:
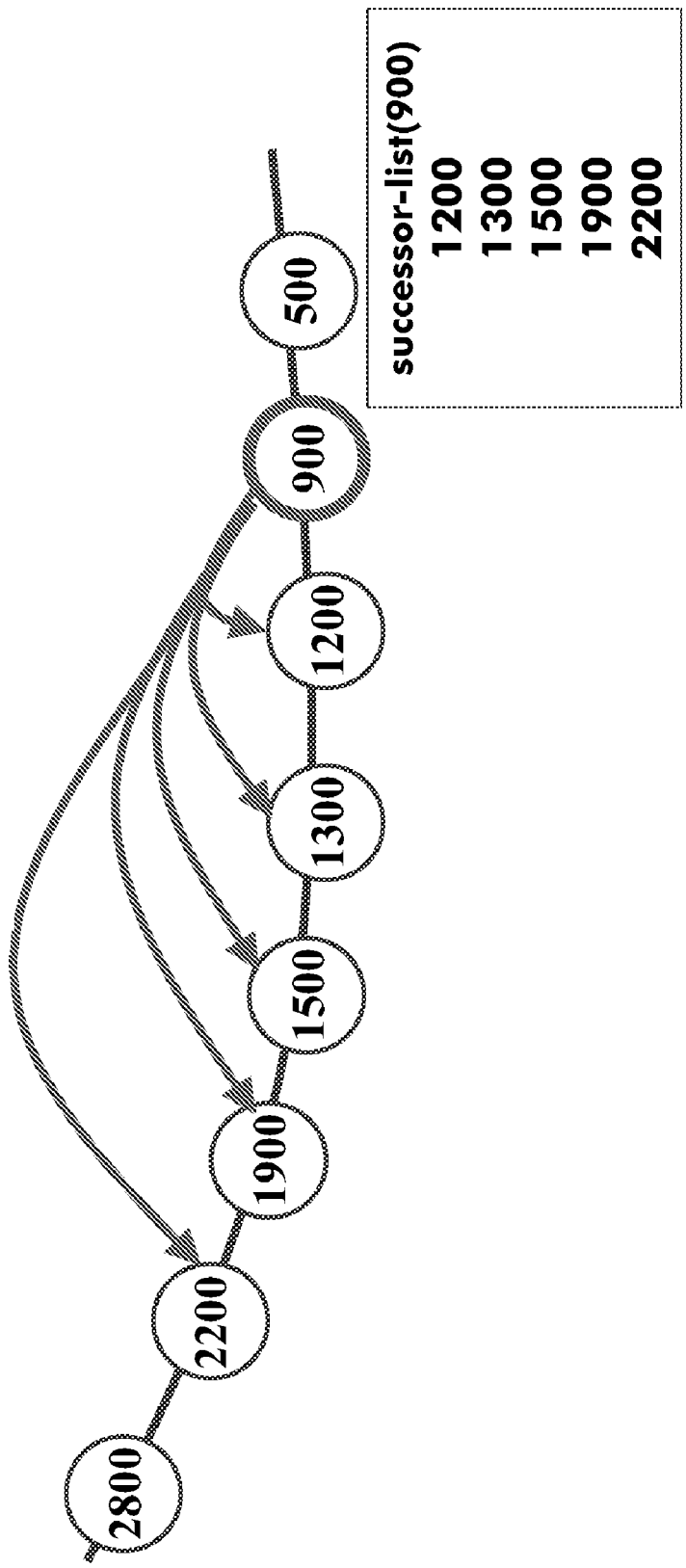
FIG. 3 illustrates the redundancy management in the method according to the invention

FIG. 3 shows the principle for the case of a redundancy factor of 5. In Chord those links are also used for data replication: Node 900 stores its data also at its successors 1200, 1300, 1500, . . . (depending on a redundancy factor). If node 900 leaves the network, node 1200 becomes responsible for the data. Since the routing direction along the ring is from lower to higher identifiers, any database request will be routed automatically to node 1200.

In the method according to the invention the redundant successor links are re-used in the opposite direction for data replication to generate backups at the neighbor nodes in case of node failure.

Figure 4:
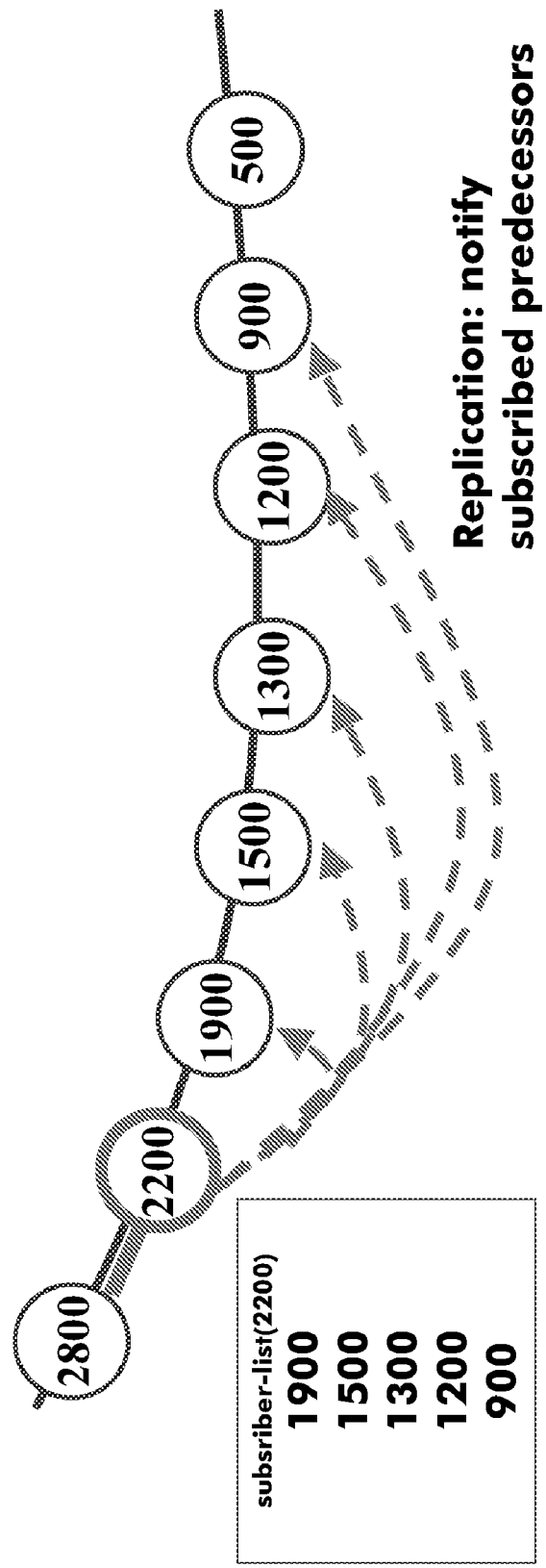
FIG. 4 illustrates the replication in the method according to the invention
Figure 5:
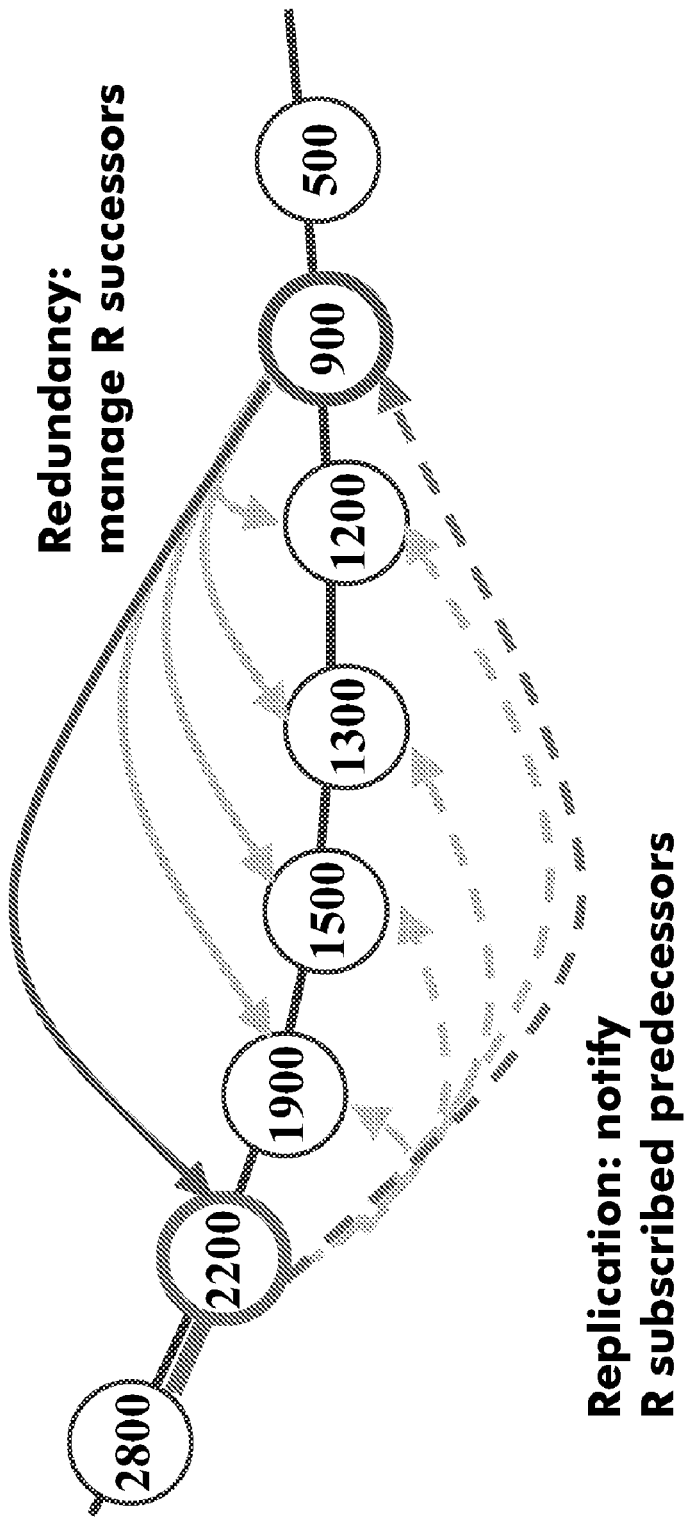
FIG. 5 illustrates the combination of redundancy and replication in the method according to the invention

FIGS. 4 and 5 illustrate the new backup strategy. In contrast to Chord, data is replicated at nodes with lower identifiers. The replicated data used for backup reasons is located on nodes that are most probably involved in the routing of a lookup. Therefore these nodes may already answer the lookup queries as they have a valid copy of the data. Therewith a load-balancing behavior is achieved that disperses queries and even reduces traffic peeks.

Consistent instant joining and data replication is a further requirement for communication systems. The invented system differs from Chord in that a joining node takes over all data it will be responsible for from its predecessor before fully joining the ring topology.

The basic joining process only depends on messages and state machines of the joining node and its predecessor. After the transfer of the data, the joining node can instantly be integrated into the routing topology without being addicted to a third node. The redundancy links together with the replication links are verified instantaneously.

Figure 6:
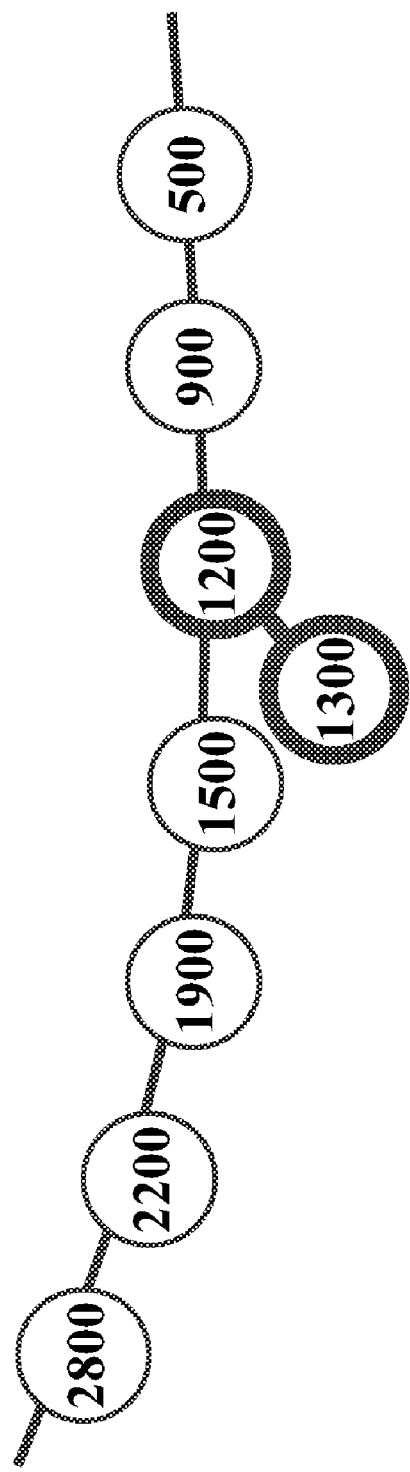
FIG. 6 illustrates a joining node in the method according to the invention
Figure 7:
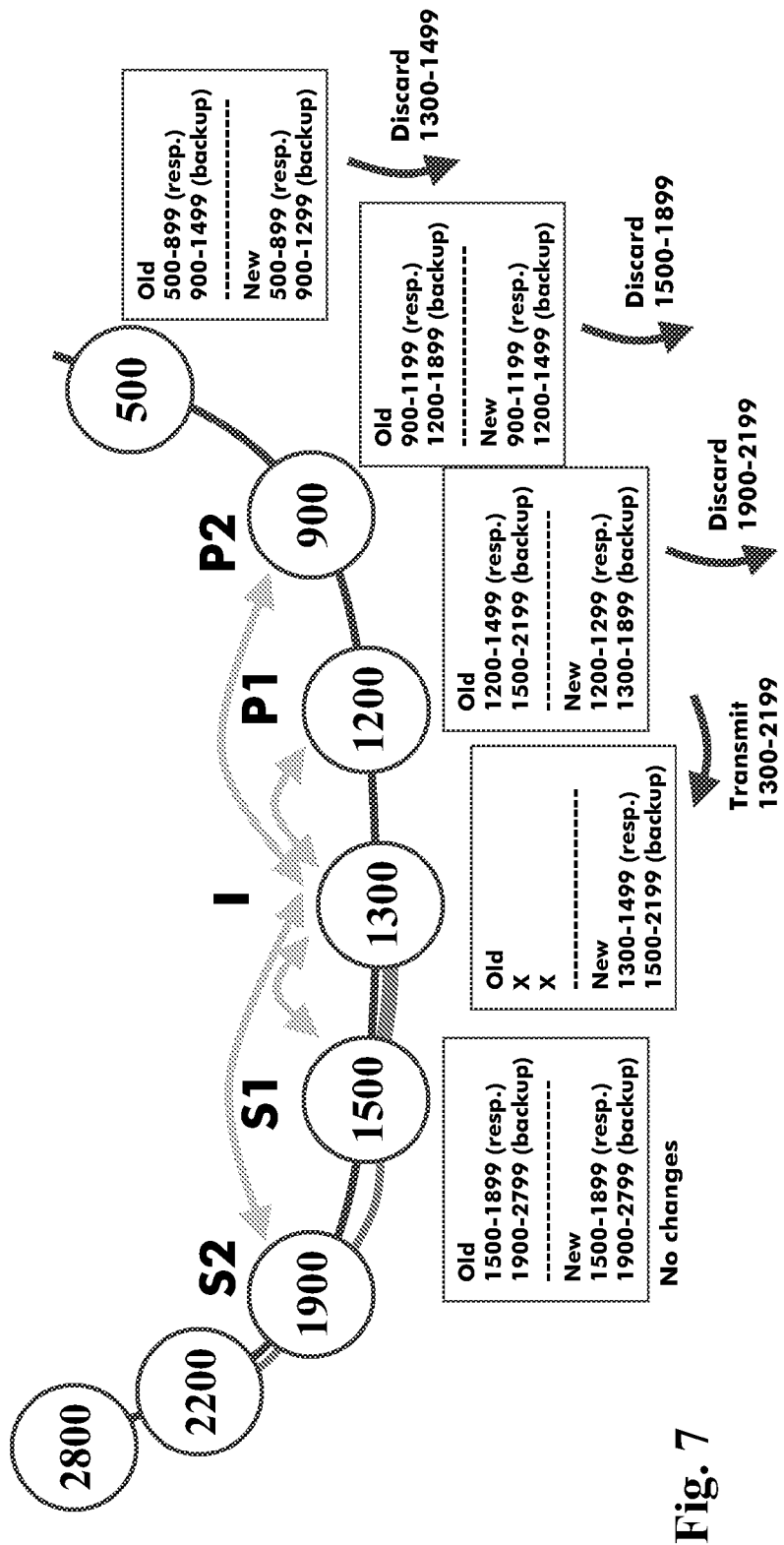
FIG. 7 illustrates the data transfer when a node joins according to the method according to the invention

FIG. 6 illustrates an initial joining of a new node 1300 in the ring. FIG. 7 shows the joining scenario of new node 1300 joining the ring behind a predecessor node 1200. During the joining process the nodes perform the following steps: First binding the new node 1300 to the predecessor node 1200, while the predecessor node 1200 remains fully connected to its successor node 1500 during the join process. Afterwards transfer of the distributed hashing table information from the predecessor node 1200 to the new node 1300. The successor and the redundancy links are transferred from the predecessor node 1200 to the new node 1300. Finally the new node 1300 is fully joining the ring by contacting the successor node 1500. The predecessor node 1200 changes the type of its link to the successor node 1500 from successor mode to redundancy mode. The replication links from new node 1300 are continuously built on request from its new predecessors.

In contrast, in Chord a joining node first finishes closing the topology and then takes over the data. The join is handled by a succeeding node. The ring topology and its consistent data backup depends on a stable predecessor link between the joining node I and its predecessor P1. This link is not established before P1 receives the information of its predecessor that the new node has become its new successor.

Because this procedure is performed periodically in a stabilize algorithm, a joining node has to passively wait for the stabilize algorithm before it is integrated into the topology.

In the modified Chord the data integrity is much higher during the joining procedure, if nodes are failing and the joining of node happens instantly and can be actively finished by the participating nodes without having to wait for any stabilization periods.

FIG. 7 illustrates the data that has to be moved by the affected nodes if node 1300 joins the topology with a redundancy factor of 2, which indicates that each node tracks two preceding nodes and hence serves as backup node for the data these nodes are responsible for. The predecessor node 1200 handles the join process. It transmits the data for the keys (1300-1500] as the new node 1300 will be responsible for those keys. In addition the data for the keys (1500-2200] are transmitted, because new node 1300 serves as backup for that data. The nodes 500, 900 and 1200 discard data as their backup interval has decreased. The successor node 1500 is not affected by the process.

Reduced routing by Shifted Data Responsibility is reached by making a node responsible for all key/value pairs that are equal or greater than its own identity, but lower than its successor's identity. Thus the routing for messages varies slightly.

In the prior art Chord routing algorithm a request has to approach the direct predecessor of the responsible node, because only the predecessor definitely knows that the requested key is located between itself and this responsible node. The predecessor is the only node that is allowed to forward a request to a node whose identity is greater than the destination key. This always results in a final hop (here called "deerjump"), see FIG. 2.

In the invented system described here the destination of a message is the preceding node. The "deer jump" problem vanishes. Hence the mean number of hops to the destination is reduced by 1 thus improving the overall performance by a factor.

Figure 8:
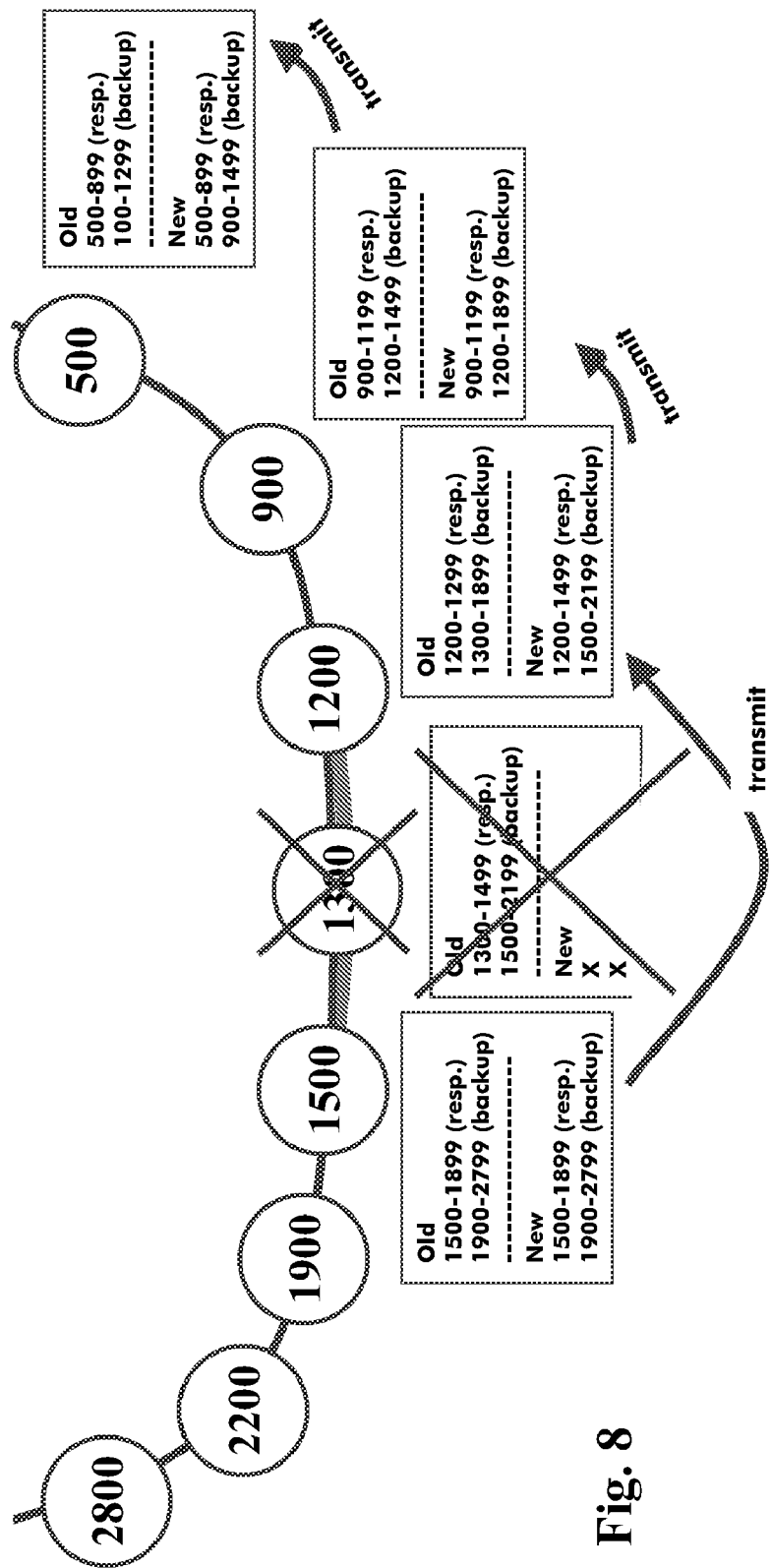
FIG. 8 illustrates a leaving node in the method according to the invention

FIG. 8 illustrates the procedure of removing this new node 1300. The elements carried by this node 1300 have to be propagated in reverse ring direction, as it is illustrated by the arrows. Afterwards the link association with this node 1300 have to be removed and the ring association between the successor and the predecessor node of this node have to be maintained, i.e. the ring has to be closed and the recovery links have to be maintained accordingly.

In the following the modifications are disclosed as algorithms in pseudo-code notation.

Let be Nid the current node, Fi finger i, and Nlist,succ a list of successors. The both algorithms show the differences between the routing algorithms of standard Chord and the enhanced Chord system. Both systems forward their messages on their way towards the final destination to a node with an identity that is as big as possible but smaller or equal to the destination identity of the message.

Whereas for the enhanced Chord a single procedure is already leading to the final destination, standard Chord needs an additional procedure for a final hop ("deer jump"). The reasons for this are the different ranges a node is responsible for: In the enhanced Chord system a node is responsible for the area between itself and the next successor. In standard Chord it is responsible for the area between its predecessor and itself. Thus the message has to be routed once behind the actual destination identity. This can only be done by the predecessor because it is the only peer that is able to exclude that there are no further peers between the destination identity and the responsible node, since this is the predecessor's successor. This deer jump is depicted in the following procedure Procedure 1.2 N.Find (key: identifier to find)

```
/* Find the next hop node for key */
if key ∈ (Npred; Nid] then
    node <= Nid
else
    if key ∈ (Nid; Nsucc] then
        node <= Nid
    else
        node <= closest-preceding-finger(key) /* procedure 1.1 */
    if node = Nid then
        /* deer jump */
        node <= Nsucc
return node
```

The maintenance procedures are similar in both systems.

Procedure 1.3 N.receive (msg)

```
/* process message */
node = N.find(msg.dest) /* procedure 1.2 */
if node = Nid
    /* Nid is responsible for this message */
    doSomething(msg)
else
    forward(msg, node)
```

Procedure 2.2 N.receive (msg)

```
/* process message */
node = N.getNextHop(msg.dest) /* procedure 2.1 */
if node = Nid
    /* Nid is responsible for this message */
    doSomething(msg)
else
    forward(msg, node)
```

The deer-jump avoiding procedure looks like

Procedure 1.1 N.closest-preceding-finger (key)

```
/* Find the closest preceding finger for the key */
node <= Nid
for i <- m down to 1 do
    if Fi is alive and Fi ∈ (Nid; key) then
        node <= Fi
        break
for all s in Nlist,succ do
    if s is alive and s ∈ (node; key) then
        node <= s
        break
return node
```

Procedure 2.1 N.getNextHop (key)

```
/* Find the next hop node for the key */
node <= Nid
for i <- m down to 1 do
    if Fi is alive and Fi ∈ (Nid; key) then
        node <= Fi
        break
for all s in Nlist,succ do
    if s is alive and s ∈ (node; key) then
        node <= s
        break
return node
```

It should be noted that more than 50% of the functionality of a telecommunication device concerns database retrievals, e.g. retrieving media (e-mail, messages, multi-media, . . . ) from a server, seeking for addresses (telephone, internet, media access control, user information, contact points) etc. Thus the relevance of an efficient data structure for look-up is of great importance for a telecommunication system.

The invention claimed is:

1. Method for retrieving content of a distributed directory of a telecommunication system comprising a plurality of nodes arranged in a directed ring topology, the method comprising:

identifying a storage location of said content by means of a distributed hashing function, where the hashing function maps an element onto a node, where the node is responsible for carrying elements with a hash value between the node and its successor node, wherein a redundancy successor link is used in an opposite direction reverse to the ring direction, for identifying neighbor nodes for data replication in order to generate backups at the neighbor nodes in case of node failure;

binding a new node to the predecessor node while the predecessor node remains fully connected to its successor node during the join process;

transferring of the distributed hashing table information from the predecessor node to the new node;

transferring the successor and the redundancy links from the predecessor node to the new node;

joining the new node to the ring by contacting the successor node; and changing a link between the predecessor node and the successor node from successor node to redundancy mode.

2. The method according to claim 1, wherein the replicated data used for backup reasons is preferably located on nodes that are most probably involved in the routing of a lookup.

3. The method according to claim 1, further comprising inserting a new node of first binding the new node to the predecessor node, while the predecessor node remains fully connected to its successor node, then transferring the elements from the predecessor node to the new node, afterwards the successor and the redundancy links are transferred from the predecessor node to the new node, and finally joining the new node into the ring topology, then updating redundancy links by the predecessor node with the link to the successor node.

4. The method according to claim 1, wherein a joining node takes over all data it will be responsible for from its predecessor before fully joining the ring topology.

* * * * *